United States Patent [19]

Gorsek

[11] 4,401,909
[45] Aug. 30, 1983

[54] GRAIN SENSOR USING A PIEZOELECTRIC ELEMENT

[75] Inventor: Edmund J. Gorsek, Springfield, Ill.

[73] Assignee: Dickey-john Corporation, Auburn, Ill.

[21] Appl. No.: 250,570

[22] Filed: Apr. 3, 1981

[51] Int. Cl.³ .............................................. H01L 41/08
[52] U.S. Cl. .................................... 310/323; 310/328; 310/330
[58] Field of Search ............... 310/321, 322, 323, 324, 310/325, 328, 329, 330, 331, 334, 311, 336; 73/DIG. 4, 649; 340/590, 691, 603–610

[56] References Cited

U.S. PATENT DOCUMENTS

| | | | |
|---|---|---|---|
| 2,561,763 | 7/1951 | Waters et al. | 310/328 |
| 3,618,062 | 11/1971 | Ott | 310/323 X |
| 3,844,174 | 10/1974 | Chabre | 310/328 X |
| 3,863,250 | 1/1975 | McCluskey, Jr. | 310/328 X |
| 4,012,604 | 3/1977 | Speidel | 310/330 X |
| 4,079,362 | 3/1978 | Grimm et al. | 310/321 X |
| 4,110,654 | 8/1978 | Paul | 310/323 |

Primary Examiner—Mark O. Budd
Attorney, Agent, or Firm—Trexler, Bushnell & Wolters, Ltd.

[57] ABSTRACT

A grain sensor comprises a piezoelectric element mounted to a rear surface of a relatively thin, flat sounding board of substantially greater surface area than the piezoelectric element. Forces experienced by the sounding board due to grain particles impinging upon the front surface thereof are imparted to the piezoelectric element. A rigid frame surroundingly engages side edges of the sounding board. The rigid frame includes an inwardly extending flange for substantially covering a peripheral edge portion of the front surface. A base member having a surface substantially congruent with the sounding board surfaces is mounted in facing relation to the rear sounding board surface for substantially enclosing the piezoelectric element therebetween. A resilient seal and spacer member is interposed between the facing surfaces of the sounding board and the base member.

14 Claims, 7 Drawing Figures

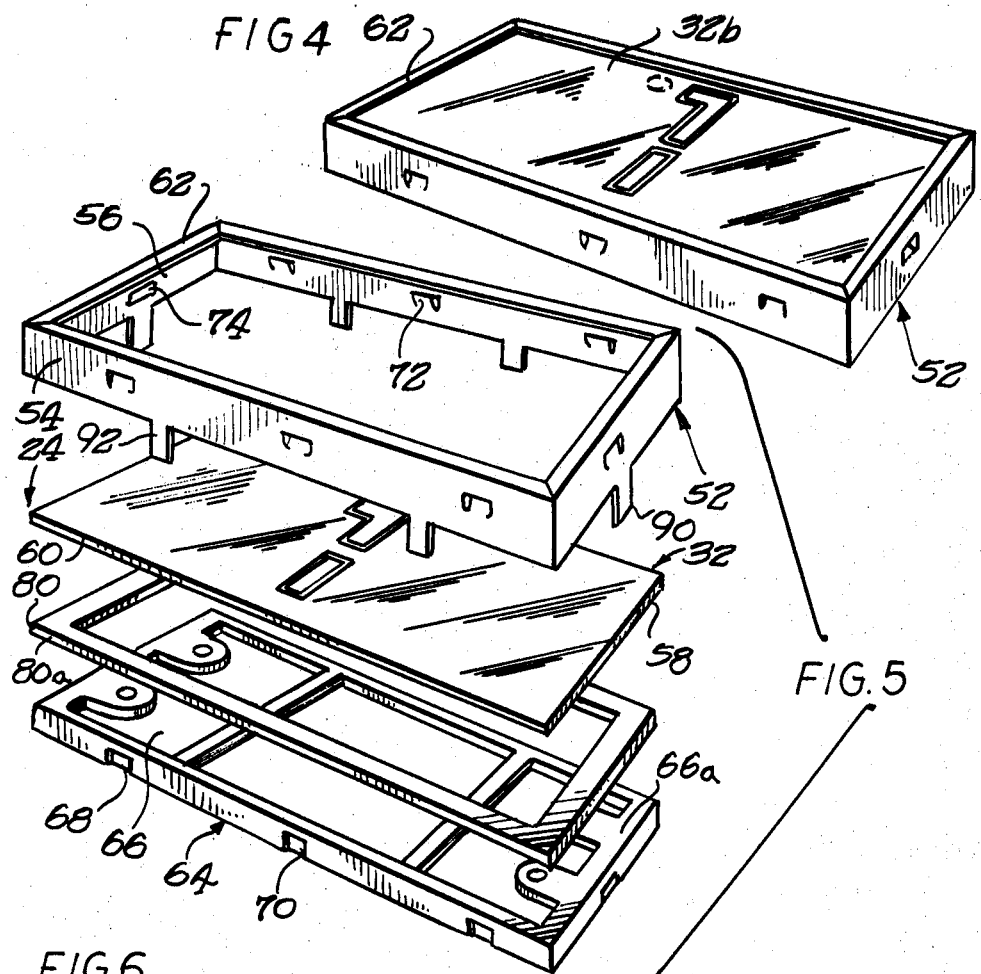
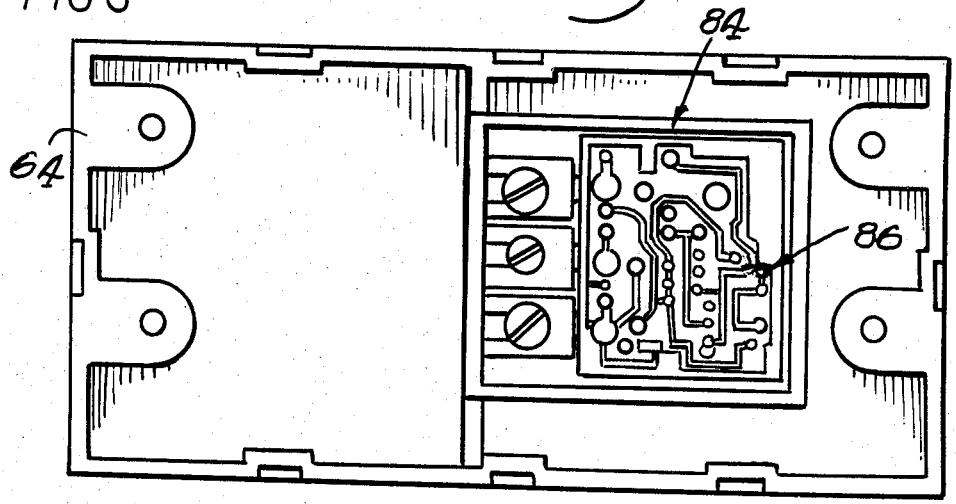

4,401,909

GRAIN SENSOR USING A PIEZOELECTRIC ELEMENT

BACKGROUND OF THE INVENTION

The present invention is directed to the sensing arts and more particularly to a grain sensor of the type including a piezoelectric element which produces a detectable electrical signal in response to forces imparted thereto. While features of the invention may be adapted to different uses, the disclosure will be directed to a grain sensor of the type utilized to detect grain loss in harvesting machinery.

In harvesting machinery such as a combine, it is desirable to monitor the grain loss during the harvesting operation. In this regard, it is the practice to monitor the quantity of grain discharged in the chaff from the combine machine in order to ensure efficiency of the harvesting operation.

Accordingly, sensors and cooperating monitoring systems have heretofore been developed for the foregoing purpose. In such systems the sensing elements or sensors are customarily located generally adjacent the points of the combine machine where waste or chaff material exits, in order to attempt to monitor the amount of grain carried off with this waste material. Consequently, the discharge ends of the walker, sieve and/or shoe portions of the combine have therefore often been provided with suitable grain loss sensors.

Generally speaking, the grain loss sensors heretofore used have included a piezoelectric element mounted to an elongate, generally flat, rigid board, generally referred to as a sounding board. Hence waste mateiral including grain particles discharged from the shoe, sieve and/or walker assembled of the combine machine impinges upon the sounding board. The sounding board in turn transmits the vibrational or other forces generated by such impingement to a piezoelectric element, which is usually affixed to the back sides thereof.

In the field, some problems have been experienced with the foregoing type of sensor structure. Namely, the sounding board, which is constantly subjected to bombardment by materials discharged form the combine, often becomes damaged or broken after a relatively short period of use. Initially, a solution to this problem was attempted by utilizing more durable materials in the manufacture of the sounding board. Additionally, it was found tht the piezoelectric element was often activated by vibration in the machinery, rather than by discharge material impinging on the sounding board. To correct this problem rubber bushings were added to the mountings for the sensors, and in some cases a comb assembly was added over the sounding board to allow lighter waste material to pass over the top of the sounding board.

Even with the foregoing modifications, both the relatively delicate piezoelectric elements and the sounding boards were often subject to environmental abuse and durability problems which reduced their expected service life. In this regard, even when constructed from a more durable material, the sounding board remained particularly susceptible to damage and breakage at its edges.

Moreover, each of the foregoing modifications resulted in the addition of parts, and hence labor in the construction of the sensor assemblies, with attendant cost escalation.

OBJECTS AND SUMMARY OF THE INVENTION

Accordingly, it is a general object of the invention to provide a novel and improved sensor assembly for use as a grain loss sensor.

A more specific object is to provide such a sensor assembly which is more durable and resistant to both environmental abuse and physical damage than heretofore known grain loss sensors.

A related object is to provide a sensor of the foregoing type which is relatively simple and economic in its construction, and yet reliable in operation.

Briefly, and in accordance with the foregoing objects, a grain sensor in accordance with the invention comprises a piezoelectric element and a substantially flat sounding board having oppositely facing surfaces of substantially greater area than piezoelectric element. The piezoelectric element is mounted to a first one of the sounding board surfaces and a rigid frame member surroundingly engages side edges of the sounding board. The frame member also includes an inwardly extending portion for substantially covering a peripheral edge portion of the opposite surface of the sounding board.

BRIEF DESCRIPTION OF THE DRAWINGS

The foregoing, as well as other objects, features and advantages of the invention will be more readily appreciated upon reading the following detailed description of the illustrated embodiment, and viewing the accompanying drawings, wherein:

FIG. 4 is a top perspective view of an assembled sensor in accordance with the present invention;

FIG. 5 is an exploded perspective view illustrating the components, and assembly thereof, to form a sensor in accordance with the present invention;

FIG. 6 is a rear view of a base member of the sensor of FIGS. 4 and 5, in accordance with one form of the invention.

DETAILED DESCRIPTION OF THE ILLUSTRATED EMBODIMENTS

Figure 1:
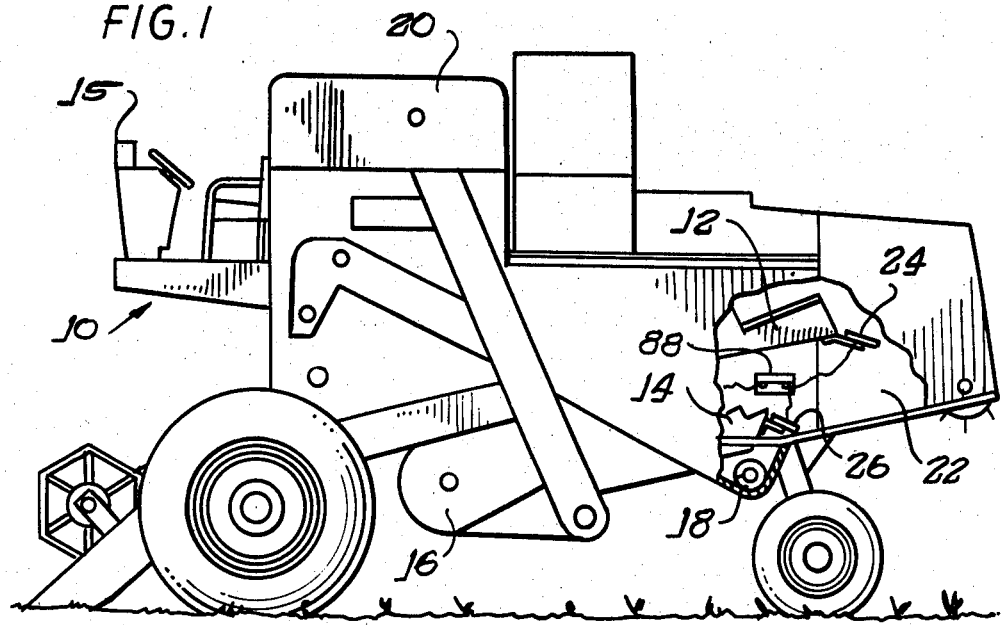
FIG. 1 is a somewhat diagrammatic representation of a combine in which one or more sensors constructed in accordance with the present invention may be utilized.

Reference is now invited to FIG. 1 wherein there is illustrated a typical harvesting machine or combine designated generally by the reference numeral 10. This combine 10 includes conventional structure for harvesting grain crops and for cleaning and separating the harvested material to remove the useful grains from the plants harvested. While much of the useful grain is separated by the action of a conventional threshing drum or cylinder (not shown), additional grain remains in the plant materials exiting this threshing drum or cylinder, which material is delivered to a conventional walker or sieve assembly 12 which acts in a known manner to separate further useful grain from the plant material. Finally, a conventional shoe assembly 14 receives grain and other small chaff particles from the walker 12 and is provided with a conventional fan 16 which acts to blow the lighter plant materials from the surface of the shoe 14, while the cleaned and separated grain particles fall through openings or apertures to suitable elevator structures 18 to be delivered to a grain storage bin 20.

In the foregoing process, the remaining plant materials or chaff are discharged at the rear portion 22 of the combine 10. Invariably, however, some amount of useful grain material is also carried off with the chaff or waste material and discharged generally at the rear end 22 of the combine 10. Monitoring or measurement of the amount of grain being discharged in this fashion provides an indication of the efficiency of operation of the combine 10, whereby the operator may make adjustments in the operations of various cooperating combine structures to increase the efficiency of the harvesting operation.

Figure 2:
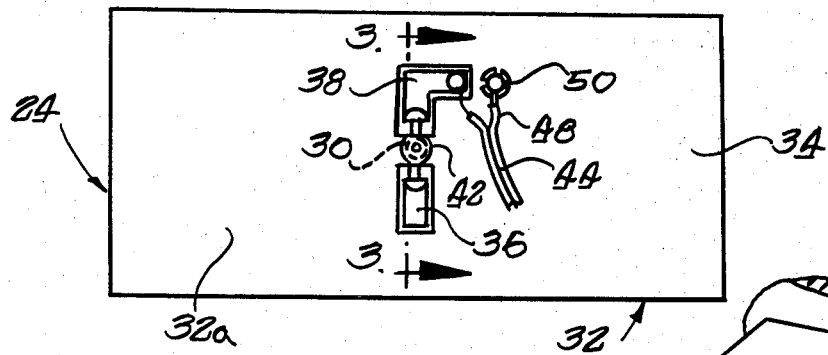
FIG. 2 is a plan view of a piezoelectric element affixed to a sounding board in accordance with the principles of the present invention.

Accordingly, it has been conventional practice to mount one or more sensors 24, 26 generally at the rear of the walker or sieve assembly 12 and the shoe assembly 14 to sense the particles of grain being discharged at these points of the combine 10. Referring now also to FIG. 2, typical sensor assemblies 24, 26 have heretofore generally included a piezoelectric element or disc 30 mounted to one side of a relatively thin, flat sounding board 32 of substantially greater surface area than the relatively small piezoelectric element or disc 30.

Departing from convention, and in accordance with the present invention, the sounding board 32 is provided with an electrically conductive coating, for example a copper foil or deposit 34, on one surface 32a thereof. Further in accordance with the present invention, the copper foil or coating 34 is etched or otherwise processed to form at least one, and preferably two, areas or portions 36, 38 which are electrically separated or isolated from the remainder of the conductive surface 34.

Figure 3:
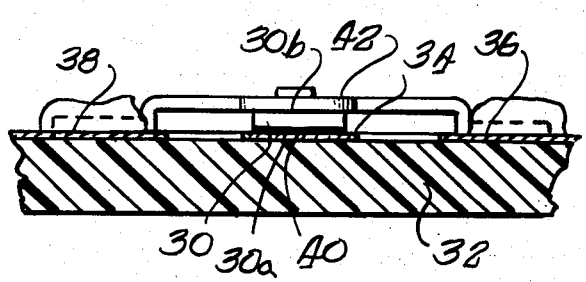
FIG. 3 is an enlarged sectional view taken generally along the line 3—3 of FIG. 2.

Referring now also to FIG. 3, the piezoelectric element 30 is secured to the conductive surface 34 generally midway between the areas or portions 36, 38. In accordance with the principles of the invention, one side 30a the piezoelectric element or disc 30 is both electrically and mechanically secured to the surface 34 by means of an electrically conductive glue or cement 40. It will be recognized in this regard that the piezoelectric disc or element 30 defines a pair of electrodes at its opposite sides 30a, 30b. Accordingly, the above electrical connection of the side 30a to the surface 34 achieves electrical connection of one electrode of the piezoelectric disc or element 30.

To achieve electrical connection with the opposite electrode 30b of the piezoelectric disc 30, an elongate, conductive, preferably metallic strap member 42 is soldered or otherwise suitably affixed thereto. This elongate strap element 42 is further secured to the sounding board 32 both mechanically and electrically, by soldering or other suitable means to the two areas or portions 36, 38. Accordingly, a pair of wires 44, 48 are soldered or otherwise suitably affixed respectively to one of the areas or portions 36, 38 and to the surface 34, thereby achieving electrical connection with both electrodes 30a, 30b of the piezoelectric disc or element 30. Preferably a small pad 50 which is electrically joined with the surface 34 is formed for this purpose.

Reference is next invited to FIGS. 4 and 5 which illustrate the remaining components of the novel sensor 24 in accordance with the present invention, and their assembly.

In accordance with the invention, a substantially rectangular frame member 52 is provided, constructed of a rigid, preferably metallic material. This frame 52 includes vertically extending side wall portions 54, 56, etc. to define a generally rectangular body for surrounding the side edges 58, 60, etc., of the sounding board 32 which is inserted therein. Further, and in accordance with a feature of the invention, the frame member includes an inwardly extending or bent-over flange or lip portion 62 about the top periphery thereof which extends over covers a corresponding, facing peripheral edge portion of the exposed top surface 32b of the sounding board 32. It is this surface 32b which is exposed to impingement by the grain particles and other material discharged from the combine 10. Advantageously, the relatively rigid material of the frame member 52 protects the sides and peripheral edges of the sounding board 32 against damage, erosion or breakage which might otherwise occur due to the constant bombardment by discharged material during the harvesting operation.

The sensor assembly 24 is also provided with a base member 64, preferably molded or otherwise formed from a durable plastics material. This base member 64 presents a top surface 66 which is of substantially the same dimensions, and hence congruent with the surfaces 32a, 32b of the sounding board 32. This base member 64 is further provided with step portions in the form of undercut channels or grooves 68, 70, etc., about the side walls thereof.

In accordance with a feature of the invention, the frame member 52 is provided with inwardly extending locating and engagement means in the form of tabs 72, 74, etc., in its side wall portions 52, 56, etc. In the illustrated embodiment, these tabs 72, 74, etc., take the form of cutout portions of the side walls 54, 56, etc., which ramp or converge inwardly of the side walls 54, 56, etc. Moreover these tabs 72, 74, etc., are located so as to interfit or interlock with the undercut grooves or channels 68, 70, etc., of the base member 64, thereby holding the sensor assembly 24 together in assembled relation. In this regard, it will be recognized that the relatively thin side wall portions 54, 56, etc., of the frame member 52 are sufficiently flexible or resilient to allow snapping engagement between the tabs 72, 74, etc., and the corresponding aligned undercut grooves or channels 68, 70, etc.

Consequently, the sounding board 32 is held securely engaged between the lip or flange 62 of the frame member 52 and the surface 66 of the base member 64. Moreover, the piezoelectric element 30 is thereby substantially enclosed between the base member 64 and the sounding board 32. Advantageously, damage to the piezoelectric element 30 from dirt, dust, moisture or the like encountered during the harvesting operation is thereby substantially avoided.

In accordance with a further feature of the invention, a resilient seal or spacer member 80 is interposed between the facing surfaces 66 and 32a, respectively, or the base member 64 and sounding board 32. This seal or spacer member 80 is preferably formed of a flexible or resilient rubber or synthetic rubber-like material. Advantageously, the combined height or thickness dimension of the sounding board 32, seal or spacer 80 and the portion of the base member 64 defined between the surface 66 and the undercut grooves or channels 68, 70, etc., is somewhat greater than the height or thickness dimension defined between the top edges of the tabs 72, 74, etc., and the inwardly extending flange or lip 62. Consequently, the resilient spacer or seal member 80 is slightly compressed therebetween to form a seal for protecting the piezoelectric element against environmental abuse from the intrusion of dirt, dust, moisture or the like.

Further with respect to the resilient seal or spacer member 80, it will be noted that the seal or spacer member 80 defines an area substantially the same as the surface areas 66, 62a or 32b, respectively, of the base member 64 and the sounding board 32. That is, the seal or spacer member 80 is formed from a substantially continuous strip of a suitable rubber of rubber-like material which extends substantially about the periphery of the surface areas 66, 32a, and is firmly engaged therebetween by the aforementioned action of the interfitting locking tabs 72, 74 of the frame member 52 and undercut grooves or channels 68, 70 of the base member 64.

Advantageously, the resilient member 80 further provides some physical isolation to the sounding board 32 and hence the piezoelectric element 30 from vibrations of the combine machine during operation. Advantageously, this physical isolation from vibration aids in substantially preventing the sounding board 32 from vibrating in response to machine vibrations, whereby the piezoelectric element 30 exhibits a relatively low level of response to such machine vibrations. Hence, the electrical effects of such vibrations may be easily separated from the electrical signals produced in response to the impingement of grain particles upon the sounding board 32.

Further in this regard, it will be seen that the spacer or seal element 80 includes a peripheral stepped surface 80a which faces a complementary stepped surface 66a about the periphery of the surface 66 of the space member 64. Hence, the spacer or seal member 80 is readily positioned and engaged with respect to the surface 66 during assembly of the sensor 24 as illustrated in FIG. 5.

Briefly, assembly of the sensor, as illustrated in FIG. 5, comprises the following steps. Initially, the seal or spacer 80 is glued or otherwise affixed to the rear surface 32a of the sounding board 32. Next, the seal or spacer member 80 is positioned with respect to the base member 64 by interengagement of the cooperating stepped portions 80a, 66a thereof. Immediately thereafter, the base member 64 and the seal or spacer 80 and sounding board 32 positioned thereon are snappingly engaged, as a unit, over and past the respective tabs 72, 74 and compressed or urged into engagement with the frame member 52 until the tabs 72, 74, etc. lock or engage with the channels or slots 68, 70, etc. As mentioned, this action tends to slightly compress the resilient spacer or seal member 80, and results in a firmly interlocked sensor assembly 24 as illustrated in FIG. 4. Additionally, a plurality of downwardly extending tabs 90, 92, etc., may be provided at the lower edges of the side walls 54, 56 of the frame member 52. Upon completion of the foregoing assembly these tabs 90, 92, etc., may be bent over behind the rear or bottom surface of the base member 64 to further ensure the integrity of the assembly thereof.

In accordance with a further feature of the invention and referring now to FIG. 6, the rear or outer surface of the base member 64 is also provided with a suitable mounting area or surface designated generally by the reference numeral 84 for receiving or mounting a conventional circuit board 86. Advantageously, this circuit board 86 may carry suitable electrical or electronic circuit components for receiving the signals over the wires 44, 48 from the piezoelectric element 30. In this regard, it may be desirable in some cases to mount a suitable amplifier or preamplifier circuit to this circuit board 86 for amplifying the signals from the piezoelectric element 30 before feeding these signals out. Hence, amplified signals may be fed to suitable monitoring circuits which may be carried on a console 15 of the combine 10 (see FIG. 1), to the improved signal-to-noise ratio of the system.

Figure 7:
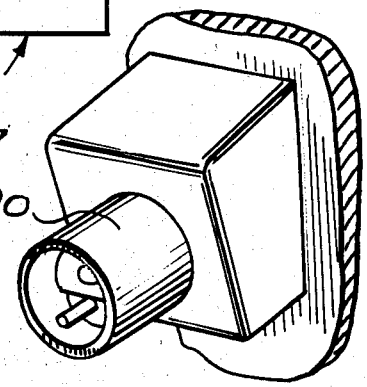
FIG. 7 is a rear perspective view of a sensor of the type shown in FIGS. 4 and 5, in accordance with another form of the invention.

In accordance with an alternate form of the invention, such amplifier circuitry may also be carried in a separate enclosure 88 (see FIG. 1) whereby there is no need for the mounting portion 84 and circuit board 86 illustrated in FIG. 6. Rather, and referring to FIG. 7, the wires 44, 48 are carried to a suitable receptacle or socket member 90 which is molded integrally with the base member 64. Hence, suitable electrical connectors may be joined with the socket or receptacle 88 for feeding the signals outwardly of the sensor assembly 24 either to the preamplifier or amplifier circuits contained in the box 88 or directly to the console 15.

What has been shown and described herein is a novel and improved grain sensor. While the invention has been illustrated and described herein with reference to a specific embodiment, the invention is not limited thereto. Rather, those skilled in the art may devise various alternatives, changes and modifications upon reading the foregoing descriptions. Accordingly, the invention includes such alternatives, changes and modifications insofar as they fall within the spirit and scope of the appended claims.

The invention is claimed as follows:

1. A grain sensor comprising: a piezoelectric element, a relatively thin, flat sounding board of substantially greater surface area than said piezoelectric element, mounting means for mounting said piezoelectric element to a first surface of said sounding board whereby forces experienced by said sounding board due to grain particles impinging thereupon are imparted to said piezoelectric element, rigid frame means for surroundingly engaging side edges of said sounding board thereby holding a second surface thereof, opposite said first surface exposed to impingement by said grain particles, said rigid frame means including inwardly extending flange means for substantially covering a peripheral edge portion of said second surface, a base member having a surface substantially congruent with said sounding board surfaces and mountable in facing relation to said first sounding board surface for substantially enclosing said piezoelectric element therebetween, resilient spacer means interposed between said facing surfaces of said sounding board and said base member, said frame means further including flexible side wall portions and inwardly extending locating means formed on said flexible side wall portions at locations spaced apart from said inwardly extending flange portions for snappingly engaging with said base member and for locating and engaging said sounding board, said resilient spacer means and said base member between said locating means and said inwardly extending flange portions.

2. A sensor according to claim 1 wherein said base member includes stepped means in a side wall portions thereof for interlocking engagement with said frame member inwardly extending locating means.

3. A sensor according to claim 2 wherein said stepped means defines a plurality of undercut channels formed in said side wall portions of said base member and wherein said inwardly extending locating means comprises a plurality of inwardly converging tabs alignable with said channels for interlocking engagement therewith.

4. A sensor according to claim 1 wherein at least a portion of said first surface of said sounding board is electrically conductive and wherein said mounting means includes electrically conductive cement means for joining one electrode of said piezoelectric element with said at least one electrically conductive portion of said sounding board first surface.

5. A sensor according to claim 4 wherein said first sounding board surface includes at least two electrically separate electrically conductive portions, said one electrode being joined to one of said electrically conductive portions and wherein said mounting means further includes electrically conductive strap means joined to and in electrical contact with an opposite electrode of said piezoelectric element and with a second of said at least two electrically conductive portions of said sounding board first surface.

6. A sensor according to claim 1 and further including mounting means formed on said base member for mounting a circuit board.

7. A grain sensor comprising: A piezoelectric element, a substantially flat, thin sounding board having oppositely facing surfaces of substantially greater area than said piezoelectric element, means for mounting said piezoelectric element to a first one of said surfaces, rigid frame means surroundingly engaging said edges of said sounding board, said frame means including an inwardly extending portion for substantially covering a peripheral edge portion of the opposite one of said surfaces of said sounding board, a base member having a surface substantially congruent with said sounding board surfaces and mountable in facing relation to said first sounding board surface for substantially enclosing said piezoelectric element therebetween, and resilient spacer means interposed between said facing surfaces of said sounding board and said base member, said spacer means comprising a continuous strip of rubber-like material extending substantially about the perimeter of said facing surfaces of said sounding board and said base member for providing a resilient vibration absorbing mounting for said sounding board.

8. A sensor according to claim 7, said frame means further including inwardly extending locating means spaced apart from said inwardly extending flange means for locating and engaging said sounding board, said resilient spacer means and at least a portion of said base member therebetween.

9. A sensor according to claim 8 wherein the space between said locating means and said flange means is slightly less than the collective thickness of said sounding board, said resilient spacer means and said portion of said base members engaged therebetween, whereby said resilient spacer means is compressed to form a seal for the enclosing said piezoelectric element.

10. A sensor according to claim 9 wherein said frame means includes flexible side wall portions, said inwardly extending locating means being formed on said flexible side wall portions for snappingly engaging with said base member.

11. A sensor according to claim 10 wherein said base member includes stepped means in a side wall portions thereof for interlocking engagement with said frame member inwardly extending locating means.

12. A sensor according to claim 11 wherein said stepped means defines a plurality of undercut channels formed in said side wall portions of said base member and wherein said inwardly extending locating means comprises a plurality of inwardly converging tabs alignable with said channels for interlocking engagement therewith.

13. A sensor according to claim 7 wherein at least a portion of said first surface of said sounding board is electrically conductive and wherein said mounting means includes electrically conductive cement means for joining one electrode of said piezoelectric element with said at least one electrically conductive portion of said sounding board first surface.

14. A grain sensor comprising: a piezoelectric element, a relatively thin, flat sounding board of substantially greater surface area than said piezoelectric element, mounting means for mounting said piezoelectric element to a first surface of said sounding board whereby forces experienced by said sounding board due to grain particles impinging thereupon are imparted to said piezoelectric element, rigid frame means for surroundingly engaging side edges of said sounding board thereby holding a second surface thereof, opposite said first surface, exposed to impingement by said grain particles, said rigid frame means including inwardly extending flange means for substantially covering a peripheral edge portion of said second surface, wherein at least a portion of said first surface of said sounding board is electrically conductive and wherein said mounting means includes electrically conductive cement means for joining one electrode of said piezoelectric element with said at least one electrically conductive portion of said sounding board first surface, and wherein said first sounding board surface includes at least two electrically separate electrically conductive portions, said one electrode being joined to one of said electrically conductive portions and wherein said mounting means further includes electrically conductive strap means joined to and in electrical contact with an opposite electrode of said piezoelectrical element and with a second of said at least two electrically conductive portions of said sounding board first surface.

* * * * *